US012709125B2

(12) United States Patent
Lamey et al.

(10) Patent No.: US 12,709,125 B2
(45) Date of Patent: Aug. 18, 2026

(54) AUTOMATIC MODE SELECTION SYSTEM

(71) Applicant: BOMBARDIER RECREATIONAL PRODUCTS INC., Valcourt (CA)

(72) Inventors: William Lamey, Hanwell (CA); Lucas Mccurlie, Hanwell (CA); Jeffrey Best, Hanwell (CA); Vinicius De Almeida Lima, Hanwell (CA); Sheila Esmeralda Gonzalez Reyna, Hanwell (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 135 days.

(21) Appl. No.: 18/738,821

(22) Filed: Jun. 10, 2024

(65) Prior Publication Data

US 2024/0408931 A1 Dec. 12, 2024

Related U.S. Application Data

(60) Provisional application No. 63/507,000, filed on Jun. 8, 2023.

(51) Int. Cl.

| | |
|---|---|
| ***B60G 17/019*** | (2006.01) |
| ***B60K 23/08*** | (2006.01) |
| ***G06V 10/26*** | (2022.01) |
| ***G06V 10/774*** | (2022.01) |
| ***G06V 10/82*** | (2022.01) |
| ***G06V 20/56*** | (2022.01) |

(Continued)

(52) U.S. Cl.

CPC ............ *B60G 17/019* (2013.01); *B60K 23/08* (2013.01); *G06V 10/273* (2022.01); *G06V 10/774* (2022.01); *G06V 10/82* (2022.01); *G06V 20/56* (2022.01); *G06V 20/70* (2022.01); *H04N 7/185* (2013.01); *B60G 2401/14* (2013.01); *B60G 2500/104* (2013.01); *B60K 2023/085* (2013.01)

(58) Field of Classification Search

CPC .............. B60G 17/019; B60G 2401/14; B60G 2500/104; B60K 23/08; B60K 2023/085; G06V 10/273; G06V 10/774; G06V 10/82; G06V 20/56; G06V 20/70; H04N 7/185

See application file for complete search history.

(56) References Cited

U.S. PATENT DOCUMENTS 10,414,404 B2 * 9/2019 Anker ................. B60W 30/182
12,384,216 B2 * 8/2025 Kim .................. B60G 17/0182

(Continued)

*Primary Examiner* — Lindsay M Low
*Assistant Examiner* — Susan E Scharpf
(74) *Attorney, Agent, or Firm* — BCF LLP

(57) ABSTRACT

Method and system for automatically selecting a mode for a vehicle, including: receiving, through a perception system of the vehicle, real-time perception data representing an environment in a direction of travel of the vehicle; receiving, through a vehicle sensor system; and predicting, using a first fitted inference model, based on the real-time perception data, first-subsystem candidate mode predictions for a first-subsystem of the vehicle. The first-subsystem candidate mode predictions correspond to a set of predefined modes for the first-subsystem, each of the predefined modes defining a respective set of one or more operating parameters for the first-subsystem. A first-subsystem mode is determined based on the first-subsystem candidate mode predictions.

20 Claims, 8 Drawing Sheets

(51) Int. Cl.
*G06V 20/70* (2022.01)
*H04N 7/18* (2006.01)

(56) References Cited

U.S. PATENT DOCUMENTS

| | | | | |
|---|---|---|---|---|
| 2002/0128751 | A1* | 9/2002 | Engstrom | G06V 40/20<br>701/1 |
| 2004/0249533 | A1* | 12/2004 | Wheals | B60T 8/172<br>701/1 |
| 2014/0350789 | A1* | 11/2014 | Anker | B62D 15/025<br>701/41 |
| 2017/0326976 | A1* | 11/2017 | Burt | B60K 23/08 |
| 2018/0154899 | A1* | 6/2018 | Tiwari | B60W 50/082 |
| 2018/0203450 | A1* | 7/2018 | Zhu | B60K 31/00 |
| 2018/0348763 | A1* | 12/2018 | Jiang | B60W 60/001 |
| 2019/0072966 | A1* | 3/2019 | Zhang | G05D 1/0212 |
| 2019/0113919 | A1* | 4/2019 | Englard | B60W 60/0015 |
| 2019/0361439 | A1* | 11/2019 | Zeng | B60W 50/0097 |
| 2019/0361456 | A1* | 11/2019 | Zeng | B60W 50/14 |

* cited by examiner

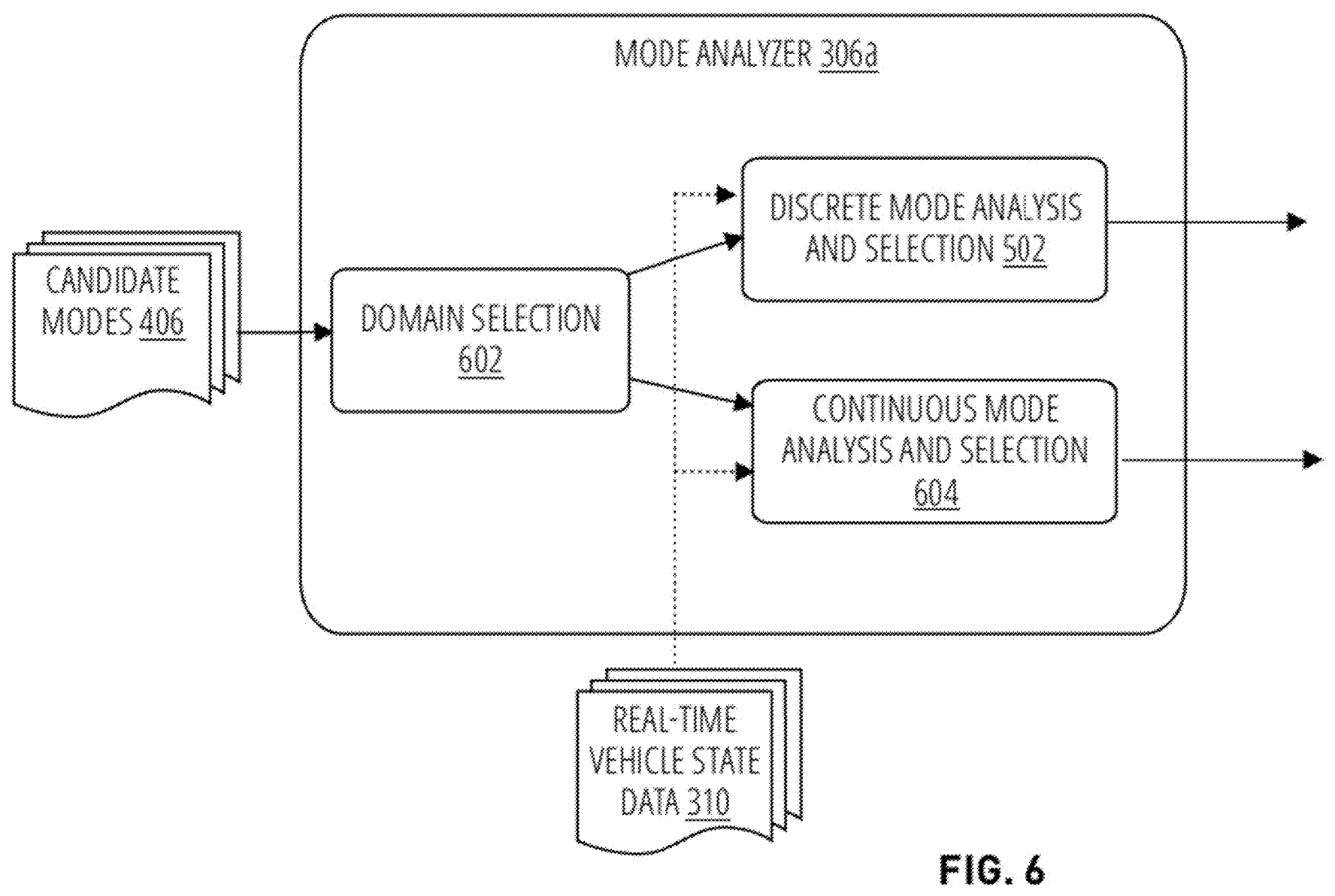

MODE ANALYZER 306a

DISCRETE MODE ANALYSIS AND SELECTION 502

CONTINUOUS MODE ANALYSIS AND SELECTION 604

DOMAIN SELECTION 602

REAL-TIME VEHICLE STATE DATA 310

CANDIDATE MODES 406

FIG. 6

AUTOMATIC MODE SELECTION SYSTEM

CROSS-REFERENCE TO RELATED APPLICATIONS

This application claims the benefit of and priority to U.S. Provisional Patent Application No. 63/507,000, filed Jun. 8, 2023, the contents of which are incorporated herein by reference.

BACKGROUND

Contemporary vehicles can have various driver selectable modes that attempt to optimize control of one or more vehicle subsystems for a variety of vehicle operating environments. A mode typically sets one or more operating parameters for one or more vehicle subsystems. These selectable modes permit a driver to choose how the vehicle behaves under different driving conditions. The parameters that can be set can, for example, include parameters such as throttle response, steering feel, gear shift points (in automatic transmission vehicles), and suspension firmness. Some common driving and subsystem modes that are routinely present in modern vehicles include the following:

Comfort Mode: This mode prioritizes a smooth and comfortable driving experience. It generally results in softer suspension settings, lighter steering, and smoother gear shifts.

Eco Mode: Eco, or Economy mode, is designed to maximize fuel efficiency. It often adjusts the vehicle's performance to minimize fuel consumption, such as by dulling throttle response or shifting gears earlier.

Sport Mode: Sport mode is designed to provide a more engaging driving experience. It might result in more responsive throttle, stiffer suspension, heavier steering, and holding gears longer before shifting to keep the engine in its power band.

Normal Mode: Normal mode provides a balance between comfort, efficiency, and performance. It's the default mode in most vehicles.

Individual/Custom Mode: Some vehicles offer a custom mode, where drivers can choose their preferred settings for various aspects of the car's behavior.

Off-Road Mode: Off-Road mode is usually found in SUVs and off-roading vehicles. It adjusts the vehicle's settings to better handle off-road conditions, such as by optimizing the all-wheel-drive system, adjusting the throttle response for better control, and in some cases, even raising the suspension for better ground clearance.

Snow/Winter Mode: This mode adjusts the vehicle's settings to handle snowy or icy conditions better. This could mean starting from a stop in second gear to avoid wheel spin, reducing throttle response, and optimizing the vehicle's stability and traction control systems.

Tow/Haul Mode: This mode is usually found in trucks or SUVs designed for towing. It adjusts transmission shift patterns to provide more power and control when towing heavy loads.

Track Mode: This mode is typically found in high-performance cars and is designed for track use. It might adjust the vehicle's settings to provide maximum performance and may even disable some driver assistance features for a more engaging driving experience.

Driver Assistance Mode: In vehicles equipped with semi-autonomous driving technology, this mode enables features like adaptive cruise control, lane keep assist, and self-parking.

Driveline Modes: Some vehicles, particularly off-road vehicles, will have user selectable discrete driveline modes, including for example two-wheel drive (2WD) mode and four wheel drive (4WD) mode.

The proliferating number of operating modes may provide some drivers with an enhanced feeling of control over how a vehicle operates. However, the modes require the operator of the vehicle to manually select the best mode for the current environment, which in at least some use case scenarios can result in user error or confusion. For example, drivers often don't know when to be in the correct mode (e.g., a driver may not select 4WD mode when required by the environment and end up getting stuck), or are inconsistent in their decisions, or simply forget. Improper mode selection can, among other things, result in a less enjoyable or comfortable driver/passenger experience and/or suboptimal vehicle performance.

Automated mode selection systems have been proposed. However, such systems tend to be reactive as modes are selected based on data about an existing physical state of a vehicle, rather than data about the upcoming environment of the vehicle.

Accordingly, there is a need for automated systems and methods for proactively selecting appropriate modes for one or more vehicle subsystems based on the upcoming conditions that the vehicle will encounter.

BRIEF SUMMARY

In example aspects, a mode that specifies one or more operating parameters is automatically selected for one or more vehicle subsystems. An inference model predicts candidate modes based on real-time perception data about the environment proximate to the vehicle captured by a perception system of a vehicle. The candidate modes are analyzed based on real-time vehicle operating state data that is captured through a vehicle sensor system. Based on the analysis, a mode is selected for the one or more vehicle subsystems from among the candidate modes.

In one aspect, a computer implemented method for automatically selecting a mode for a vehicle. The method includes: receiving, through a perception system of the vehicle (for example, a forward facing imaging camera) real-time perception data representing an environment in a desired direction of travel of the vehicle; receiving, through a vehicle sensor system, real-time vehicle state data indicating current operating characteristics of the vehicle; and predicting, using a first fitted inference model, based on the real-time perception data, a first-subsystem candidate mode for a first-subsystem of the vehicle. The first-subsystem candidate mode is selected from a set of predefined modes for the first-subsystem, each of the predefined modes defining a respective set of one or more operating parameters for the first-subsystem. The method also includes determining, based on the real-time vehicle state data and the first-subsystem candidate mode, a first-subsystem mode, and causing the first-subsystem mode to be implemented by the first-subsystem. In some examples, a computer implemented method and system is disclosed for automatically selecting a mode for a vehicle, comprising: receiving, through a perception system of the vehicle, real-time perception data representing an environment in a desired direction of travel of the vehicle; predicting, using a first fitted inference model, based on the real-time perception data, a first-subsystem candidate mode for a first-subsystem of the vehicle, wherein the first-subsystem candidate mode is selected from a set of predefined modes for the first-subsystem, each of the predefined modes defining a respective set of one or more operating parameters for the first-subsystem; determining, based the first-subsystem candidate mode, a first-subsystem mode; and causing the first-subsystem mode to be implemented by the first-subsystem. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer implemented method for automatically selecting a mode for a vehicle. The computer implemented method also includes receiving, through a video camera of the vehicle, real-time perception data may include a sequence of image frames representing an environment in a direction of travel of the vehicle. The method also includes predicting, using a first fitted inference model, based on the sequence of image frames, a sequence of first-subsystem candidate mode predictions for a first-subsystem of the vehicle, where the first-subsystem candidate mode predictions correspond to a set of predefined modes for the first-subsystem, each of the predefined modes defining a respective set of one or more operating parameters for the first-subsystem. The method also includes determining, based on the sequence of first-subsystem candidate mode predictions, a first-subsystem mode. The method also includes causing the first-subsystem mode to be implemented by the first-subsystem. Other embodiments of this aspect include corresponding computer systems, apparatus, and computer programs recorded on one or more computer storage devices, each configured to perform the actions of the methods.

Implementations may include one or more of the following features. The method where determining the first-subsystem mode may include: filtering the sequence of first-subsystem candidate mode predictions to identify a possible first-subsystem mode prediction, and selecting the first-subsystem mode based on the possible first-subsystem mode prediction. Each of the first-subsystem candidate mode predictions may include a candidate mode probabilities vector that includes a respective probability value for each of the predefined modes for the first-subsystem, where filtering the predicted sequence of first-subsystem candidate mode predictions may include applying an impulse response filter to the sequence of first-subsystem candidate mode predictions, the output of the impulse response filter may include the possible first-subsystem mode prediction. The filtering is based on a most recent prediction in the sequence of first-subsystem candidate mode predictions, past predictions in the sequence of first-subsystem candidate mode predictions and past possible first-subsystem mode predictions output by the filtering. Filtering applies low pass filtering to the sequence of first-subsystem candidate mode predictions. Determining the first-subsystem mode further may include performing a time check to confirm that a time threshold has passed since a last first-subsystem mode was caused to implemented, and when the time threshold has not passed, causing the receiving, predicting and determining to be repeated without causing the first-subsystem mode to be implemented by the first-subsystem. Selecting the first-subsystem mode based on the possible first-subsystem mode prediction may include performing a hysteresis decision based on a most recent first-subsystem mode that was caused to implemented. Performing the hysteresis decision may include: computing, for each of the predefined modes, a mode-specific difference between the probability value for each of the predefined modes in the first-subsystem mode prediction and a probability value determined for the most recent first-subsystem mode that was caused to implemented; computing for each mode-specific difference that has a value greater than a predefined mode-specific hysteresis value that corresponds to the most recent first-subsystem mode that was caused to implemented, a difference between the mode-specific difference and the predefined mode-specific hysteresis value; and selecting, as the first-subsystem mode, a mode associated with the highest computed difference between the mode-specific difference and the predefined mode-specific hysteresis value. The predicting may include predicting a respective first-subsystem candidate mode prediction for each of the resized and cropped image frame included in the extracted subset of image frames. At least one of a filtering rate used for the filtering and a rate used for extracting the subset of image frames, is based on a vehicle speed included in the real-time vehicle state data. The first-subsystem corresponds to a driveline system of the vehicle and the set of predefined modes may include a four wheel drive mode and a two wheel drive mode. The first-subsystem corresponds to a suspension system of the vehicle and the set of predefined modes may include a first mode, a second mode and a third mode, where the first mode corresponds to a softer ride than the second mode and the second mode corresponds to a softer ride than the third mode. The method may include pre-training the first fitted inference model, the pre-training may include: obtaining a time-stamped sequence of image frames captured by a forward-facing camera video camera of a test vehicle during operation of the test vehicle by an expert driver; obtaining a time-stamped sequence of mode inputs performed by the expert driver contemporaneously with the capturing of the image frames; merging the sequenced of the images frames and the mode inputs to provide a set of labelled training image frames; and training a convolution neural network based on the labelled training image frames to obtain the first fitted inference model. Determining the first-subsystem mode may include: identifying, based on the sequence of first-subsystem candidate mode predictions, a possible first-subsystem mode that is appropriate for real-time implementation by the first-subsystem; and confirming that the possible first-subsystem can be applied as the first-subsystem mode based on a time duration since a most recently implemented first-subsystem candidate mode. Identifying a possible first-subsystem candidate mode that is appropriate may include confirming that the real-time implementation will meet specified vehicle criteria, where the the vehicle criteria specifies one or more operating constraints at which the first-subsystem candidate mode can be implemented, the operating constraints including one or more of a maximum speed, operating state of one or more other vehicle subsystems, and a direction of travel. Implementations of the described techniques may include hardware, a method or process, or computer software on a computer-accessible medium.

One general aspect includes a computer implemented method for automatically selecting a mode for a vehicle. The computer implemented method also includes receiving, through a perception system of the vehicle, real-time perception data representing an environment in a desired direction of travel of the vehicle. The method also includes predicting, using a first fitted inference model, based on the real-time perception data, a sequence of first-subsystem candidate mode predictions for a first-subsystem of the vehicle, where each of the first-subsystem candidate mode predictions corresponds to a set of predefined modes for the first-subsystem, each of the predefined modes defining a respective set of one or more operating parameters for the first-subsystem. The method also includes determining, based the sequence of first-subsystem candidate mode predictions a first-subsystem mode. The method also includes causing the first-subsystem mode to be implemented by the first-subsystem. Other embodiments of this aspect include corresponding computer systems, apparatus, and computer programs recorded on one or more computer storage devices, each configured to perform the actions of the methods.

One general aspect includes a vehicle equipped with a computer system. The vehicle also includes receiving, through a video camera of the vehicle, sequence of image frames representing upcoming terrain in a direction of travel of the vehicle. The vehicle also includes predicting, using a first fitted inference model, based on the sequence of image frames, a sequence of candidate mode predictions for the vehicle, where the candidate mode predictions correspond to a set of predefined modes for a system of the vehicle, each of the predefined modes defining a respective set of one or more operating parameters for the system. The vehicle also includes determining, based on the sequence of candidate mode predictions, a system mode. The vehicle also includes causing the system mode to be implemented by the vehicle. Other embodiments of this aspect include corresponding computer systems, apparatus, and computer programs recorded on one or more computer storage devices, each configured to perform the actions of the methods.

Implementations may include one or more of the following features. The vehicle where determining the system mode may include: filtering the sequence of candidate mode predictions to identify a possible system mode prediction; and selecting the system mode based on the possible system mode prediction. Each of the candidate mode predictions may include a candidate mode probabilities vector that includes a respective probability value for each of the predefined modes, where filtering the sequence of candidate mode predictions may include applying an impulse response filter to the sequence of candidate mode predictions, the output of the impulse response filter may include the possible system mode prediction. The filtering is based on a most recent prediction in the sequence of candidate mode predictions, past predictions in the sequence of candidate mode predictions and past possible system mode predictions output by the filtering. Implementations of the described techniques may include hardware, a method or process, or computer software on a computer-accessible medium.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6 illustrates a block diagram of an alternative example of a Mode Analyzer in accordance with one embodiment.

DETAILED DESCRIPTION

The present disclosure describes examples of automatic mode selection systems for a vehicle. These systems and methods can be used in place of manual selection of vehicle modes. A vehicle's operating environment is interpreted based on real-time perception data acquired using one or more perception sensors and the real-time perception data is translated into a mode prediction using an artificial intelligence based model that has been fitted using expert experiences in a variety of environments. The disclosed systems and method can alleviate one or more of the following problem areas: Reduce user error (e.g., ensure the correct mode is selected for upcoming terrain); Improve user comfort (e.g., adjust modes automatically to provide a more comfortable experience, for example, select the right 'suspension' mode to provide a comfortable ride; Improve user performance (e.g., give "expert" experience to novice drivers; and System efficiency (e.g., different modes can map to different vehicle efficiencies, for example 4WD vs 2WD).

Figure 1:
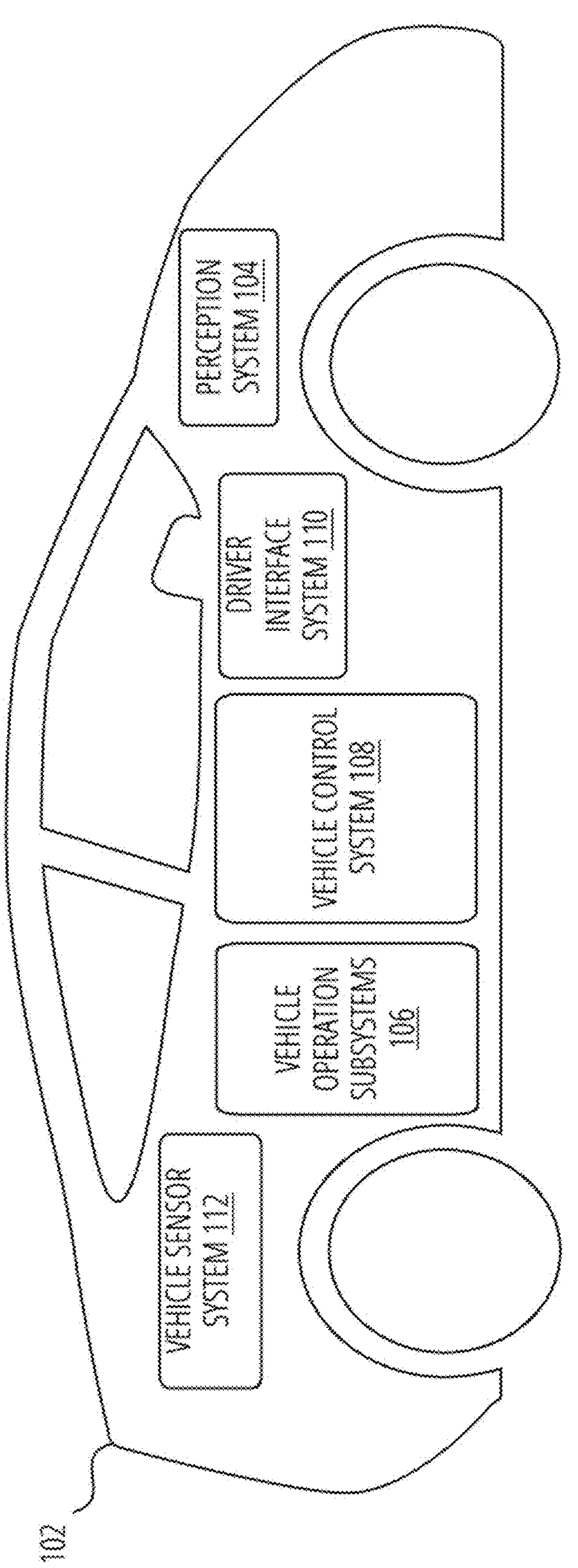
FIG. 1 schematically illustrates a vehicle to which aspects of the disclosure can be applied.

FIG. 1 schematically illustrates an example of a Vehicle 102 to which example implementations described in this disclosure can be applied. Vehicle 102 can, in various examples, be any moving platform that includes selectable modes for either driver-in-the-loop vehicle operation or autonomous vehicle operation. As used in this disclosure, a "mode" can refer to a set of one or more predefined operating parameters that control how one or more vehicle subsystems operate. Examples of different modes will be described in greater detail below. As used in this disclosure, an operating parameter can include a setting or value that controls one specific aspect of a Vehicle Subsystem behavior. Examples of operating parameters include accelerator gains, braking bias, suspension damping rates, and steering assist gains, among other things. As used in this disclosure, "Vehicle Subsystem" (also referred to as a "Vehicle Operation Subsystem") can refer to a distinct, functional unit within a vehicle that is made up of several interrelated components. Each subsystem serves a specific purpose and contributes to the overall operation, performance, safety, and comfort of the vehicle. Subsystems may include the powertrain, chassis, brakes, steering, energy storage system, energy conversion system, electrical system, cooling system, and the heating and air conditioning system, among others.

Examples of possible vehicle platforms for Vehicle 102 include, but are not limited to: off-road recreational vehicles such all terrain vehicles (ATVs), side-by-side (S×S) vehicles, and utility terrain vehicles (UTVs); snowmobiles; motorcycles; commercial and personal on-road vehicles; heavy equipment vehicles such as mining and construction vehicles; and military vehicles. In some examples, Vehicle 102 can be an internal combustion engine powered vehicle; in some examples, Vehicle 102 can be an electrical vehicle; in some examples, Vehicle 102 can be a hybrid vehicle.

In the illustrated example, Vehicle 102 includes a number of on-board systems, including but not limited to, Perception System 104, Vehicle Operation Subsystems 106, Vehicle control system 108, a Driver Interface System 110, and a Vehicle sensor system 112.

Figure 2:
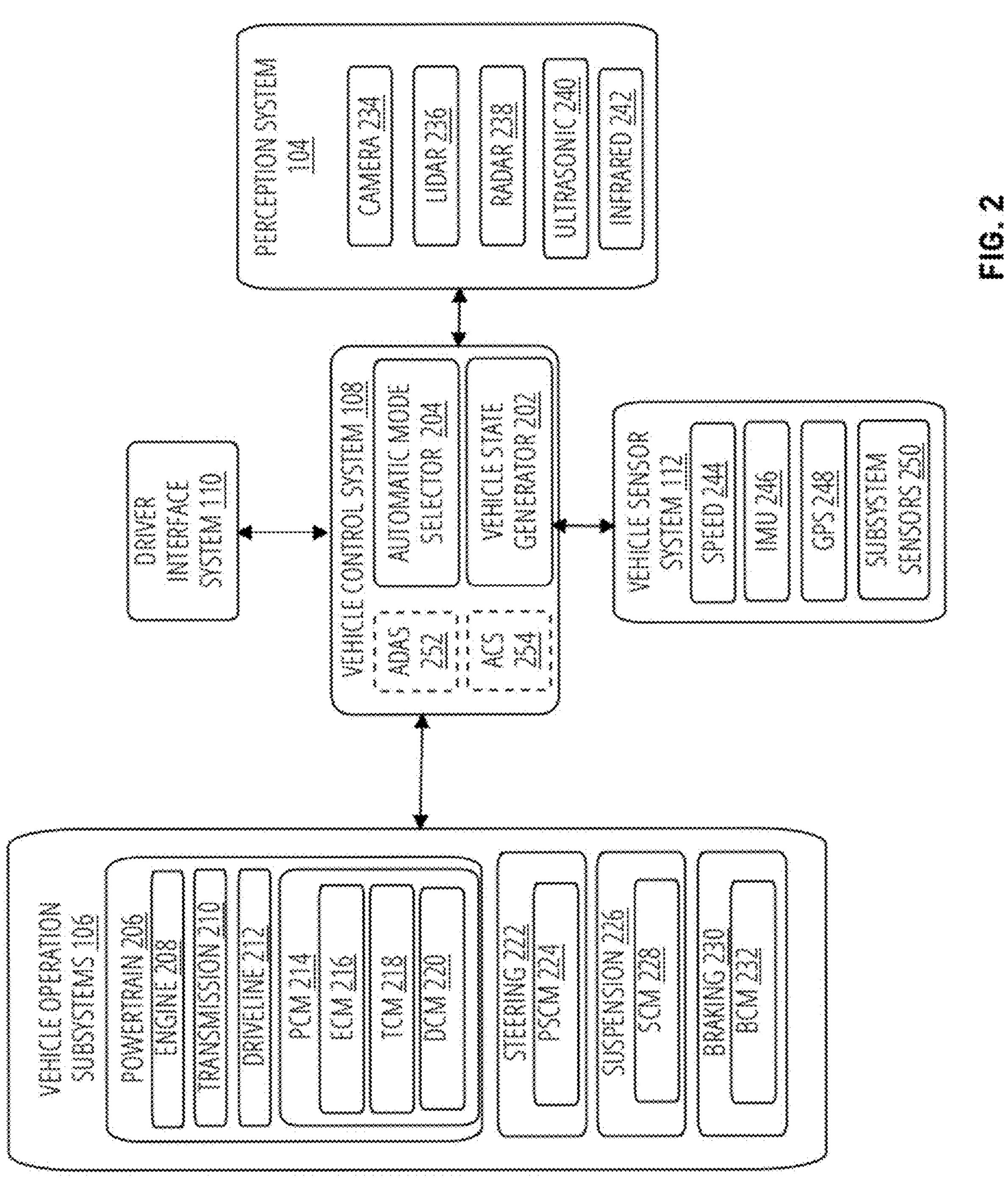
FIG. 2 illustrates block diagrams of examples of systems and subsystems of the vehicle of FIG. 1 in accordance with one embodiment.

FIG. 2 illustrates examples of the on-board systems in greater detail, according to example embodiments.

Perception System 104 includes one or more sensor systems that are designed to capture real-time perception data that represents the environment that the Vehicle 102 is operating within, including the environment in an intended direction of travel of the Vehicle 102. In example embodiments, the perception data can take the form of 2D or 3D image data that is represented, for examples, as time-series of frames of pixels or point-cloud elements. Examples of sensor systems used to capture perception data can, for example, include: Visual light Camera(s) 234, LiDAR 236 (Light Detection and Ranging), Radar 238 (Radio Detection and Ranging), Ultrasonic 240, and Infrared 242.

Vehicle sensor system 112 includes a set of sensors for sensing operating conditions of the Vehicle 102 and its subsystems. The information collected by Vehicle sensor system 112 can be used to generate real-time vehicle state data 310. The Vehicle sensor system 112 can include sensors for collecting high level operating data about the vehicle, including a speed sensor 244 for sensing current vehicle speed, an IMU 246 (Inertial Measuring Unit) for measuring the vehicle's specific force, angular rate, acceleration and body orientation (pose) in 3 dimensions, and a satellite positioning system such as a GPS (Global Positioning System) receiver system 248 used to determine the vehicle's exact location. The Vehicle sensor system 112 can also include subsystem specific sensors 250 that are embedded in one or more of the Vehicle Operation Subsystems 106 for collecting subsystem specific operating condition data.

Driver Interface System 110 includes components that interface with a driver to receive driver inputs and provide feedback to the driver. Driver input components can, for example include a steering input, throttle input and brake input components, as well as other input components such as a manual mode selection input.

Vehicle Operation Subsystems 106 includes subsystems of the vehicle that can be controlled to cause the Vehicle 102 to operate. By way of example, these subsystems can include Powertrain 206, Steering 222, Suspension 226 and Brake 230 systems. One or more of these subsystems can include further subsystems. For example, the Powertrain 206 includes all subsystems that provide power to the components (e.g., wheels) that propel the vehicle, including a power source 208 and a drivetrain (which includes, as further subsystems, a Transmission 210 and Driveline 212).

The Driveline 212 is a vehicle subsystem that distributes power from the power source and Transmission 210 to the wheels. While the exact components in Driveline 212 may vary depending on the design and configuration of the Vehicle 102 (e.g., front-wheel drive, rear-wheel drive, all-wheel drive, or four-wheel drive), they will typically include: (a) driveshaft, which transmits torque from the transmission to the differential for distribution to other driveline components; (b) differential(s), which transmits torque directly or indirectly to the wheels; and (c) Axle shafts connect to either side of a differential and extend outward toward a respective wheel.

The Transmission 210 converts the energy generated by the power source into a power that can be distributed by the Driveline 212 to propel the vehicle. Common vehicle transmission types include manual transmissions, automatic transmissions and continuous variable torque (CVT) transmissions.

Other Vehicle Operation Subsystems 106 include Steering 222, Suspension 226 and Braking 230.

Vehicle Operation Subsystems 106 are typically controlled by respective control modules (also referred to as control units or electronic control units) that are embedded systems that control one or more of the electrical systems or subsystems in a vehicle. By way of example, in the illustrated example, the following control modules are illustrated:

Powertrain Control Module (PCM) 214: The PCM 214, which controls functions of the power source 208), Transmission 210 and Driveline 212 and may, for example be a combination of an Engine Control Module (ECM) 216, Transmission Control Module (TCM) 210 and Driveline Control Module (DCM) 220. The ECM 216 can, for example, in the case of a combustion engine power source manage engine performance by controlling fuel mixture, ignition timing, and variable valve timing, among other things. The TCM 218 controls the operation of the transmission, including gear shifting and torque converter clutch control. The DCM 220 controls operation of components of the Driveline 212, including for example the function of the differentials.

Power Steering Control Module (PSCM) 224: In vehicles with electronic power steering, the PSCM 224 controls the power steering motor to provide the appropriate level of steering assist and feedback.

Suspension Control Module (SCM) 228: In vehicles with adaptive suspension systems, the SCM 228 adjusts the suspension settings based on driving conditions.

Brake Control Module (BCM) 232: This module controls the vehicle's braking system, including the anti-lock braking system (ABS) and, in some cases, the electronic stability control (ESC) system.

In the illustrated example, all of the systems and modules noted above are connected to communicate, directly or indirectly, with Vehicle control system 108. Vehicle control system 108 receives and processes data from Perception System 104, Vehicle sensor system 112, Driver Interface System 110 and Vehicle Operation Subsystems 106. Vehicle control system 108 processes the data it receives and provides feedback and commands to Vehicle Operation Subsystems 106 to cause the Vehicle 102 to function as intended. For example, in a driver-in-the-loop system, Vehicle Operation Subsystems 106 can include the processing systems required to interpret driver inputs received via the Driver Interface System 110 and provide corresponding instructions to the control modules of the Vehicle Operation Subsystems 106 such that the Vehicles 102 performs (e.g., accelerates, brakes, and turns) as instructed by the driver. In some examples, the Vehicle control system 108 can include an advanced driver assistance system (ADAS) 252 that can adjust or override driver inputs based on data from Perception System 104 and Vehicle sensor system 112. In some example's, Vehicle control system 108 can include an autonomous control system (ACS) 254 that can control Vehicle Operation Subsystems 106 based on data from Perception System 104 and Vehicle sensor system 112 without any driver input.

As noted above, the present disclosure is directed towards automatic mode selection, and in this regard, vehicle control system 108 is illustrated as including an Automatic Mode Selector 204. In example embodiments, Automatic Mode Selector 204 is a functional module that is implemented by a Computing System 702 (described in greater detail below) that includes a memory storing software instructions that, when executed by a processor of the Computing System 702, configure the Computing System 702 to perform the automatic mode selection functionality described herein.

As shown in FIG. 2, vehicle control system 108 can also include a Vehicle State Generator 202 that is configured to receive data about the sensed operating conditions of the Vehicle 102 and its subsystems from the Vehicle sensor system 112 and output corresponding real-time vehicle state data 310 for use by the other components of vehicle control system 108. By way of example real-time vehicle state data 310 can include a data structure or vector that includes, among other things, values for the following vehicle operating characteristics: vehicle speed, direction of travel, vehicle pose; angular acceleration in 3 dimensions, linear acceleration, engine RPM, wheel slippage, braking and torque applied at wheels, steering angle, transmission gear, driveline state (e.g.: AWD; 4WD; 2WD; locked or unlocked differential(s)), driver inputs (steering, braking, throttle), and suspension control valve setting. The real-time vehicle state data 310 may, for example, be updated several times per second.

As noted above, example aspects of the present disclosure are directed towards systems and methods for performing of automatic mode selection. In this regard, Automatic Mode Selector 204 is shown in greater detail in FIG. 3. In one illustrated example, Automatic Mode Selector 204 operates in conjunction with, or is part of, ADAS 252. In such a scenario, Automatic Mode Selector 204 is configured to select a mode for open or more Vehicle Operation Subsystems 106 and then cause the vehicle control system 108 to cause the selected mode to be applied by the relevant Vehicle Operation Subsystem(s) 106.

In some examples the automatic mode selector 204 can be configured to perform multiple subsystem mode selections in parallel, and in this regard can include multiple subsystem mode selection channels 312*a*, 312*b*, . . . , 312*c* each of which includes a respective Subsystem Mode Classifier 304*a*, 304*b*, . . . , 304*c* and Mode Analyzer 306*a*, 306*b*, . . . , 306*c* for outputting a respective Subsystem Operating Mode 308*a*, 308*bc*, . . . , 308*c*. Thus, the respective mode selection channels 312*a*, 312*b*, . . . , 312*c* can each receive the same inputs (real-time perception data 302 and real-time vehicle state data 310) but are each configured to predict and select modes for different subsystems of the vehicle. The frequency of outputted Subsystem Operating Modes 308*a*, 308*bc*, . . . , 308*c* can be different for each mode selection channel 312*a*, 312*b*, . . . , 312*c*.

An example of mode selection for a first-subsystem of the Vehicle Operation Subsystems 106 will now be described in respect of mode selection channel 312*a*. In this regard, Automatic Mode Selector 204 is configured to receive, through one or more of the sensors of Perception System 104, real-time perception data 302 representing an environment in a direction of travel of the Vehicle 102. In a particular example implementation, Automatic Mode Selector 204 is configured to receive perception data 302 that takes the form of a single time series of 2D-image frames 303_1, 303_2, . . . , 303_N that are captured by a single 2D Visual light Camera 234. In such an implementation, the single 2D image data feed that is processed by Automatic Mode Selector 204 represents image data of the upcoming environment that the vehicle is travelling in, including for example images of the upcoming surface terrain. Limiting the perception data to a single 2D-image feed can, in at least some use cases, be advantageous in that the same Automatic Mode Selector 204 can be easily adapted for use on many different vehicle platforms as forward facing 2D-image cameras are commonly present on many vehicle platforms. Furthermore, machine learning (ML) based model processing of 2D images can be done in a computationally efficient manner, enabling Automatic Mode Selector 204 to be installed on vehicle-based computing systems that may have limited processing power and/or memory available to support ML based components.

The Automatic Mode Selector 204 also receives, through a Vehicle sensor system 112, real-time vehicle state data 310 indicating current operating characteristics of the Vehicle 102. The first-subsystem is associated with a set of predefined modes, and each of these predefined modes defines a respective set of one or more operating parameters for the first-subsystem. Automatic Mode Selector 204 includes a Subsystem Mode Classifier 304*a* that maps the real-time perception data to a candidate mode from the set of predefined modes. Automatic Mode Selector 204 also includes a Mode Analyzer 306*a* that determines a first-subsystem mode based on the real-time vehicle state data and the first-subsystem candidate mode. The selected first-subsystem mode is then communicated to the first-subsystem for real-time implementation.

Figure 4:
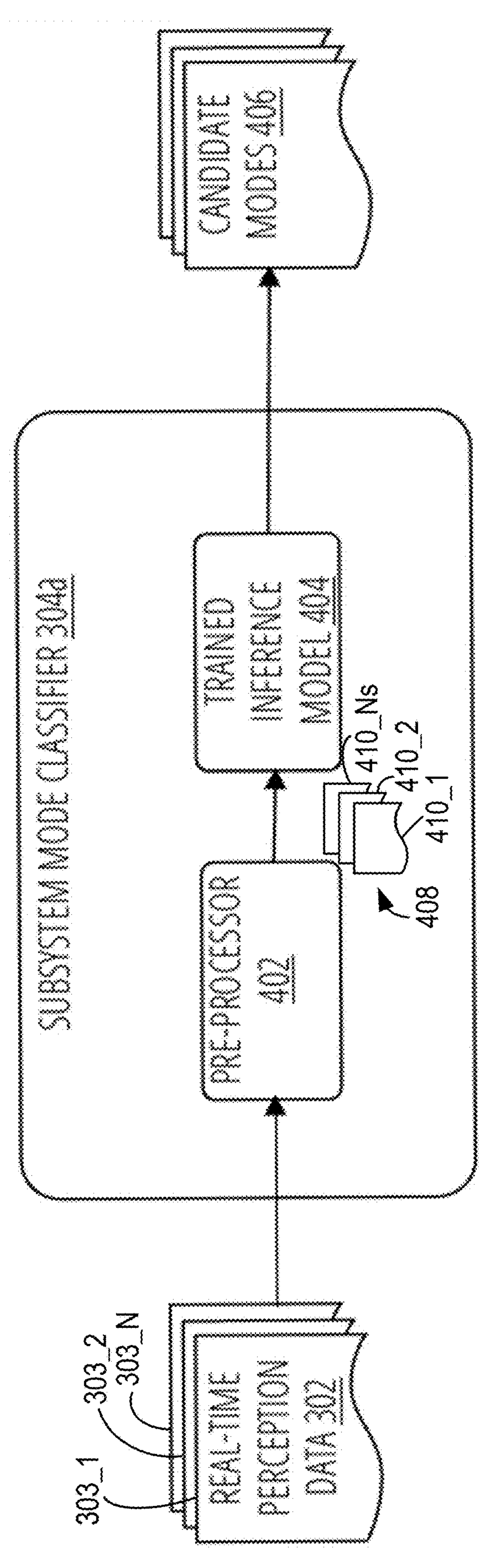
FIG. 4 illustrates a block diagram of a subsystem mode classifier of the Automatic Mode Selector in accordance with one embodiment.
Figure 4:

An example of Subsystem Mode Classifier 304*a* is illustrated in FIG. 4. In the illustrated example, Subsystem Mode Classifier 304*a* includes a pre-processor 402 and a fitted (e.g., trained) inference model 404. Pre-processor 402 is configured to perform any pre-processing activities (e.g., data fusion over multiple frames or from multiple sensors, filtering, camera lens correction, abstraction operations, and/or dimensionality reductions operations) that may be required to pre-condition real-time perception data 302 to put such data into a suitable condition for fitted inference model 404.

In one example implementation, pre-processor 402 of Subsystem Mode Classifier 304*a* is configured to output pre-conditioned perception data 408 in respect of real-time perception data 302. In this regard, in one example, implementation, pre-processor 402 includes an image frame sampling operation to extract a subset of the 2D-image frames 303_1, 303_2, . . . , 303_N that make up real-time perception data 302. By way of example, in one possible scenario, the real-time perception data 302 that is obtained by the pre-processor 402 from Visual light Camera 234 consists of 60 image frames-per-second (FPS), with each image frame 303_*i* (i is used throughout this paper to denote a generic element within a set of elements) represented as a tensor having dimensions: width (columns)=1280 units, height (rows)=720 units, depth=3 units, the subject units are pixels, with each pixel indicating a measured light intensity value. The height and width dimensions correspond to respective 2D orthogonal spatial dimensions, and the depth dimensions correspond to respective color channels (e.g., RGB). Pre-processor 402 is configured to extract a subset of image frames from the perception data 302 at a specified sampling rate that can be pre-defined to optimize operation of its respective mode selection channel. For example, a different image frame sampling rate can be set for mode selection channel 312*a* than for mode selection channel 312*a* based on a required responsiveness for the mode that is the subject of the respective mode selection channel. By way of example, in one use case scenario, the sampling rate for the pre-processor 402 in respect of mode selection channel 312*a* may be set during system configuration to provide 10 FPS (i.e., 1 frame of every 6 frames of a 60 FPS video feed is extracted), while the sampling rate for the pre-processor 402 in respect of mode selection channel 312*b* may be set during system to provide 30 FPS (i.e., 1 frame of every 2 frames of a 60 FPS video feed is extracted). In at least some implementations, the sampling rate for the pre-processor 402 can also be dynamically set based on real-time operating characteristics of the vehicle indicated in the vehicle state data 310. For example, a faster sampling rate may be applied as vehicle speed increases.

In an illustrated example, Subsystem Mode Classifier 304*a* is further configured to resize and crop the extracted subset of Ns frames. By way of example, in one possible scenario, the width 1280, height=720, depth=3 of each extracted frame is resized to width=400, height=225, depth=3 by combining sub-groups of pixels in the width and height dimensions of each channel using a standard resizing algorithm. The resized image frames are then cropped by performing a center crop operation to extract the central 225 columns of each resized image frame, resulting in a square image frame of width=225, height=225, depth=3. In at least some examples, the resulting reduced-dimension square image frames 410_1, 410_2, . . . , 410_Ns can be processed by mode analyzer 306*a* using fewer computational resources than would be required by the original uncropped larger size images, without adversely impacting prediction accuracy. In at least some examples, the pre-processor 402 is configured to perform dimensionality reduction operations (such as resizing and cropping) that are pre-defined to optimize operation of its respective mode selection channel. For example, different image frame dimensionality operations or parameters can be set for mode selection channel 312*a* than for mode selection channel 312*a* based on the requirements for the mode that is the subject of the respective mode selection channel. In some examples, the extracted image frames may be further preprocessed to convert the 3 color channels into a single grey-scale channel.

Fitted inference model 404 is a machine learning (ML) based model that has been fitted to predict a future mode for the first-subsystem based on the upcoming environment that is represented in the pre-conditioned perception data 408. Fitted inference model 404 can for example include a convolution neural network (CNN) that is configured by learned parameters to perform a classification operation in respect of the input pre-processed perception data 408 to classify the perception data 408 as belonging to a selected category (i.e., a candidate mode) from a set of possible categories (i.e., a set of predefined modes that the first-subsystem can operate in). In some examples, fitted inference model 404 is configured to generate respective candidate mode predictions 406 at a rate of between 5 to 20 mode predictions per second. This prediction rate is illustrative only, and slower or faster rates (e.g., 30 mode predictions per second) may be used in different implementations depending on the hardware and software used to implement the systems of Vehicle 102. In the example implementation where the pre-conditioned perception data 408 consists of image frames 410_1, 410_2, . . . , 410_Ns, the fitted inference model 404 is configured to generate a respective candidate mode prediction 406 for each of the image frames 410_1, 410_2, . . . , 410_Ns. In an example implementation, fitted inference model 404 can be a computational and memory resource light model that can run on a computational device that has limited processing and memory resources. A non-limiting example of such a CNN model is the ShuffleNet V2 model [Sec: Ningning Ma, Xiangyu Zhang, Hai-Tao Zheng, Jian Sun; ShuffleNet V2: Practical Guidelines for Efficient CNN Architecture Design; arXiv: 1807.11164v1, 2018].

Figure 8:
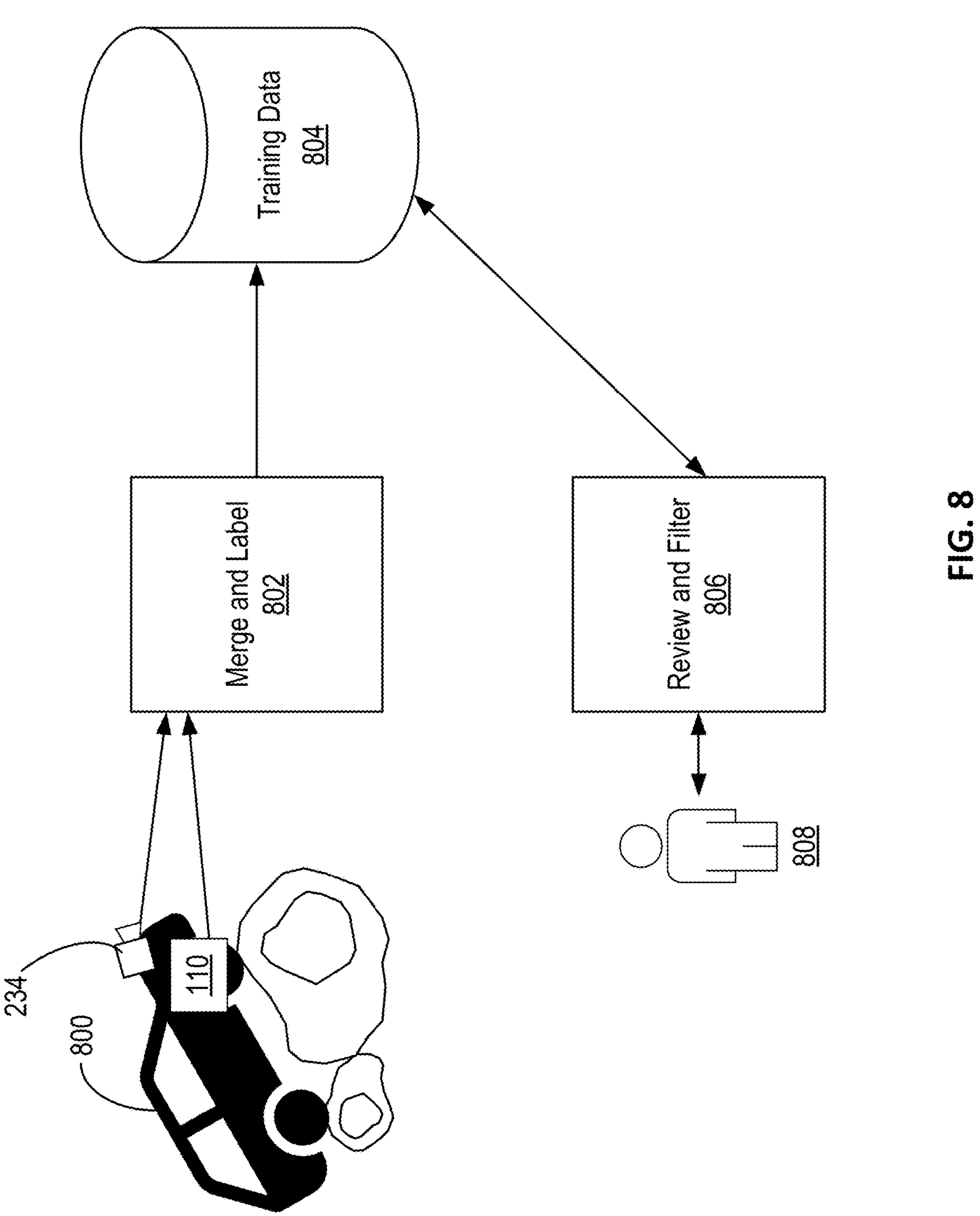
FIG. 8 is a schematic diagram illustrating a process for obtaining a training dataset according to example implementations.

In example embodiments, the fitted inference model 404 is an artificial learning based model that has been trained based on a labeled training dataset acquired by monitoring manual mode inputs of an expert driver of a training vehicle and associating the mode inputs with perception data captured by the perception system of the training vehicle contemporaneously with the mode inputs as the test vehicle is driven by the expert driver through multiple test environments that are representative of all intended uses of the vehicle. By way of example, FIG. 8 illustrates a process for obtaining a set of labelled training data 804 for training a fitted inference model 404. In the example of FIG. 8, a professional driver drives a vehicle 800 that can be operated in multiple modes for one or more types of modes (for example, multiple driveline modes and/or multiple suspension modes). During operation of the vehicle 800, the driver manually selects different modes using a driver interface system 110, which is configured to record and timestamp the mode selections as they occur. Simultaneously, a forward facing 2D video camera 234 affixed to the vehicle 800 records times stamped image frames of the upcoming terrain. The recorded and timestamped mode selections and the recorded and timestamped image frames are provided to a computer hosted merge and label function that auto-labels the image frames by tagging each image frame with a label corresponding to the respective mode selection at the time the image frame was captured, providing labelled training data 804. In at least some examples, the raw image frames may be conditioned processed by applying the same mode-type specific resizing and cropping operations as discussed above in respect of pre-processor 402, so that image frame included in labelled training data 804 have the same dimensionality as the image frames that the trained inference model 404 will be processing in real-time operation. In at least some example embodiments, all image frames obtained from the image feed provided by video camera 234 are auto-labelled (e.g., all frames in a 60 FPS feed) in order to maximize the number of training images.

In some example implementations, the auto-labelled image frames included in training data 804 are selected for quality review by either an automated or manual review and filter process 806. For example, computer-implemented review and filter process 806 can be configured to remove outlier image frames that do not meet specified training image criteria. For example, images that are occluded by debris on a camera lens or a passing branch or other non-terrain-relevant object may be removed from the training dataset 804 to provide a higher quality training dataset. In some examples, review and filter process 806 can include a user interface that enables a human reviewer 808 to visually inspect image frames and delete image frames that do not meet quality criteria. In some examples, review and filter process 806 can be configured by a rules-based or machine learning based model to automatically review and filter our image frames that don't meet training image criteria. In some examples, this automated review can be used to pre-filter image frames that are then selectively presented to a human reviewer 808 to confirm that the selected image frames should be discarded or kept.

Figure 5:
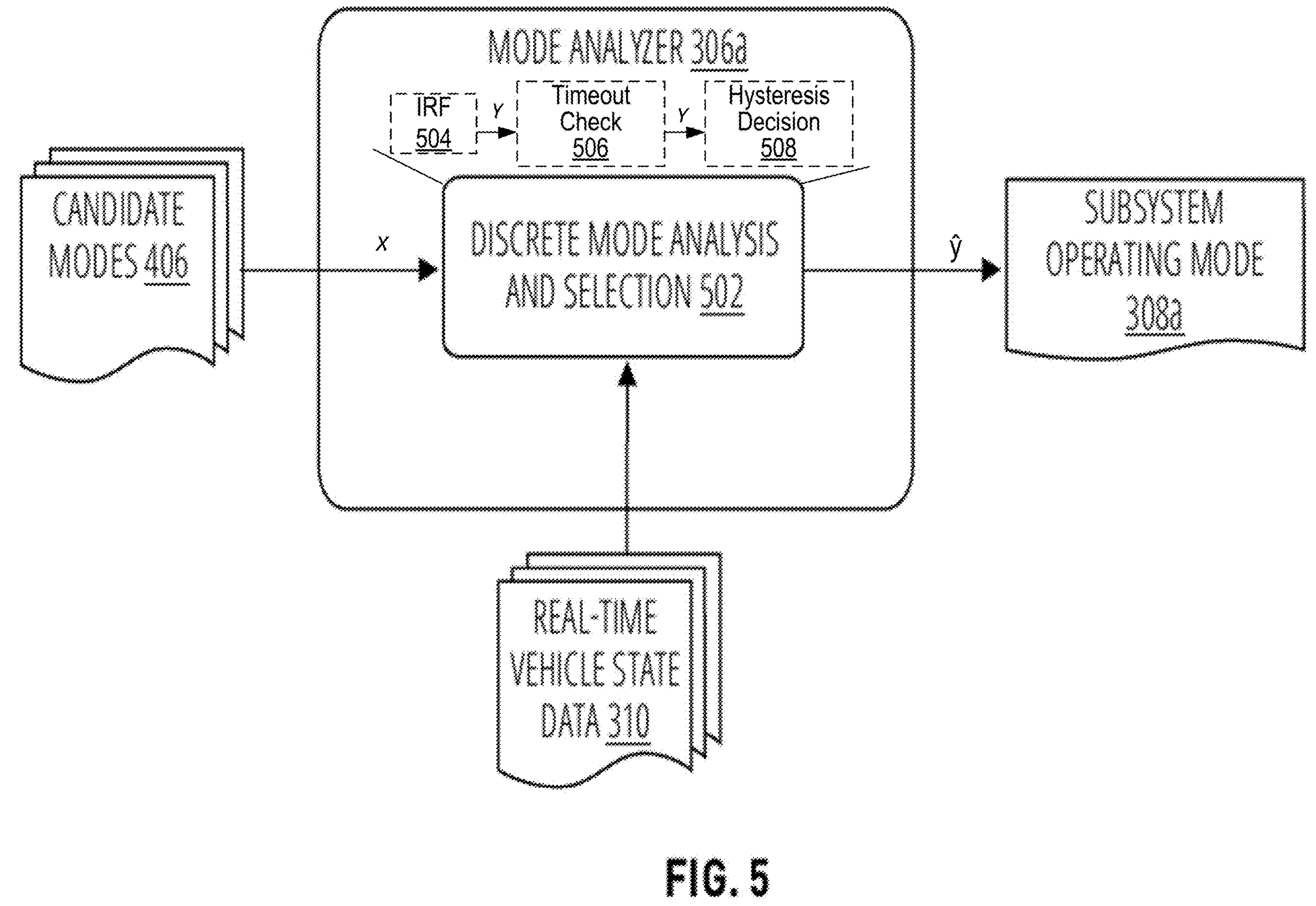
FIG. 5 illustrates a block diagram of a Mode Analyzer of the Automatic Mode Selector in accordance with one embodiment.

With reference to FIG. 5, the candidate modes predictions 406 predicted by Fitted inference model 404 are provided to Mode Analyzer 306*a*. The Mode Analyzer 306*a* is configured to assess, based on the real-time vehicle state data, the appropriateness of the candidate modes to filter out modes that are not appropriate for real-time implementation by the first-subsystem. The Mode Analyzer 306*a* selects an appropriate first-subsystem mode that is then communicated to the first-subsystem for implementation.

In the example of FIG. 5, Mode Analyzer 306*a* performs discrete mode analysis and selection 502. The Mode Analyzer 306*i* for each respective mode selection channel 312*i* can be uniquely configured for the mode prediction task that is performed by that channel. As noted above, fitted inference model 404 can, in some examples, generate a respective candidate mode prediction 406 predictions at a rate of between 5 to 20 or more mode predictions per second. However, discrete mode selection and implementation may, for at least some mode channels, be performed at a much slower rate that can be subsystem (e.g., mode channel) dependent. For example, in some scenarios Mode Analyzer 306*a* will output an updated first-subsystem operating mode 308*a* every 3 seconds to 10 seconds, dependent on the type of vehicle operation subsystem that the mode selection is intended for. In some examples, Mode Analyzer 306*a* may be configured to output an updated operating mode 308*a* multiple times per second.

In a first example, Mode Analyzer 306*a* will perform preliminary mode selection based on sampling the candidate modes that are included in a time series set of candidate mode predictions 406. For example, the Mode Analyzer 306*a* can be configured to select a candidate mode that has appeared a threshold number of times within a preceding number of time steps in the candidate mode predictions 406. By way of example, a mode that has appeared as a candidate mode in greater than 80% of the candidate mode predictions for a 5 second duration can be selected as a preliminary mode selection.

In some scenarios, subsystem specific criteria can then be applied to determine the appropriateness of the preliminary mode selection, including the following: (1) compatibility of preliminary mode selection with the mode that is currently being applied by the subsystem (e.g., in some scenarios it may not be possible to switch directly from one mode to another mode without first going through one or more intermediate modes); (2) time duration since the current mode was selected and implemented (e.g., in some scenarios, excessive mode switching may be problematic); and (3) compatibility of the preliminary mode selection with one or more current vehicle state 310 characteristics (e.g., some mode changes may be deemed unsafe or inappropriate if a speed or other operating characteristic exceeds or otherwise does not meet some predefined threshold).

If the preliminary mode selection is determined to be appropriate, the Mode Analyzer 306*a* selects the preliminary mode selection as the first-subsystem mode and causes that mode to be implemented by the first-subsystem. In the preliminary mode selection is determined to be not appropriate it is rejected and is not provided for implementation. The Mode Analyzer 306*a* then continues on with preliminary selection and analysis of a further mode based on the next time-series of predicted modes.

In at least some examples, the subsystem specific criteria applied to determine the appropriateness of the preliminary mode selection may exclude some of the criteria categories noted above. For example, the subsystem specific criteria could be based on one or both of: (1) compatibility of preliminary mode selection with the mode that is currently being applied by the subsystem and (2) time duration since the current mode was selected and implemented (e.g., in some scenarios, excessive mode switching may be problematic), without specifically considering compatibility of the preliminary mode selection with one or more current vehicle state 310 characteristics. In such scenarios, the current vehicle state 310 as sensed by the vehicle sensor system 112 is not required for automatic mode selection.

An alternative operation of mode analyzer 306*a* according to a second example implementation will now be described. In an example embodiment, discrete mode analysis and selection 502 functions as a decider that includes the following set of operations: (1) an impulse response filtering operation (IRF) 504; (2) a timeout check operation 506; and (3) a hysteresis decision operation 508. Among other things, these operations collectively filter the candidate mode predictions 406 output by inference model 404 to enable meaningful control signals to be applied to the relevant vehicle operation subsystems 106 that are associated with the subject control mode.

Impulse response filtering (IRF) operation 504 will now be described in greater detail. In an example embodiment, each candidate mode prediction 406 output by inference model 404 can be represented as a probabilities vector (e.g., a Softmax classification vector) $\{X \in \mathbb{R}^n \mid \|X\|=1\}$, where n is the number of candidates modes for the mode selection channel 312*a*, and each element x in the n dimensional vector $X=[x_{-1}, x_{-2}, \ldots x_{-n}]$ represents the probability of a respective candidate mode. By way of example, in a driveline mode selection channel, n can=3, and the candidate modes can include the three candidate modes: (1) Rear Wheel Drive (RWD); (2) Four Wheel Drive (4WD); and (3) Locked Differential Four Wheel Drive (4WD Locked). IRF operation 504 filters the candidate mode predictions 406 using an impulse response filter, which could for example be an Infinite Impulse Response (IIR) filter or a Finite Impulse Response (FIR) filter depending upon the mode selection task.

In the example where an IIR filter implementation is applied, a Transposed-Direct-Form-II (TDF-II) structure can be used, as represented by the following equation:

$$Y = b_0 X + \sum_{i=1}^{k} (b_i X_i - a_i Y_i)$$

where:

- Y is the filtered candidate mode probabilities vector $Y=[y_{-1}, y_{-2}, \ldots y_{-n}]$, output by the IIR filter;
- k is the order of the filter.
- $b_0$, $b_i$ and $a_i$ and are coefficients chosen during the design of the filter (e.g., low-pass with a set cut-off frequency).
- Xi are the past mode predictions 406 made by the inference model 404, i.e., $X_1$ is the last probabilities vector before the current inference model output, $X_2$ the second last and so on.
- Yi are the past output vectors of the IIR filter itself i.e., $Y_1$ is the last filtered probabilities vector output before the current output, $Y_2$ the second last and so on.

In example implementation, coefficients $b_i$ and $a_i$ are defined to provide a low-pass filter with a defined cut-off frequency (e.g., 10 Hz). Thus, Impulse response filtering (IRF) operation 504 controls a rate at which candidate modes are provided to downstream operations.

In the case where a FIR filter implementation is applied, the Direct-Form-II (TDF-II) structure can be used, as represented by the following equation in which the variables each have the same meanings as noted above:

$$Y = b_0X + \sum_{i=1}^{k} b_iX_i$$

Timeout check operation 506 will now be described in greater detail. The timeout check operation 506 is performed to check if enough time has passed since the last time that a change occurred in the operating mode 308*a* output by the mode analyzer 306*a*. The objective of Timeout check operation 506 is to provide sufficient time for the vehicle operation subsystems 106 that are affected by the mode selection to successfully apply the changes to the vehicle and/or improve the experience of the occupants (for example, constant changes to driveline or suspension settings can be uncomfortable due to noise and vibration). In this regard, mode analyzer 306*a* is configured to record a "last mode change" time whenever a new operating mode 308*a* output by the mode analyzer 306*a*. Timeout check operation 506 is configured to compare a current time with the recorded "last mode change" time to a defined time criteria, for example a minimum time threshold. If the elapsed time since the last subsystem operating mode change meets or exceeds the minimum time threshold, the mode analysis and selection 502 then proceeds to the hysteresis decision operation 508. In the event that the elapsed time since the last subsystem operating mode is less than the minimum time threshold, the mode analysis and selection 502 proceeds back to IRF operation 504 to process an updated set of incoming candidate modes 406 without outputting a new operating mode 308*a*. In at least some example implementations, the minimum time threshold parameter is uniquely set for each respective mode selection channel 312*i*. In some examples, timeout check operation 506 may be configured to adapt the minimum time threshold within a defined range based on the real-time vehicle state data 310. For example, the minimum time threshold may decrease as vehicle speed increases, thereby enabling mode changes to occur more frequently at higher speeds.

Hysteresis decision operation 508 will now be explained in greater detail. This operation implements an heuristic to dynamically add a delay to the implementation of a candidate mode from the mode probabilities vector Y based on a hierarchy level defined for the changes between the candidate modes that are controlled by a mode selection channel 312*i*. For example in the case of the above mentioned driveline mode example (candidate modes=RWD; 4WD; 4WD Locked), and the vehicle 102 is about to exit a 4WD area into a 2WD area, the trained inference model 404 will be already predicting that the driveline system 212 should switch to 2WD at a time at which some wheels of the vehicle would still be inside a 4WD area. If a mode change is implemented before the vehicle 102 is fully out of the 4WD area, the vehicle could get stuck. If the situation is reversed and the vehicle is about to exit a 2WD area into a 4WD area, then an early change will not cause any problem. Thus, when changing from 4WD to 2WD mode, a higher delay (hysteresis) is desirable than when changing from 2WD to 4WD mode. This is accomplished by defining a hysteresis vector $\{H\in\mathbb{R}^n\}$, where n is the number of candidate modes, for the hysteresis decision operation 508. In this regard, hysteresis decision operation 508 processes the following data to select a candidate mode 308*a* for implementation. (1) the current filtered candidate mode selection probabilities vector $Y=[y_{-1}, y_{-2}, \ldots y_{-n}]$ generated by the (IRF) operation 504; (2) a hysteresis vector $H=[h_{-1}, h_{-2}, \ldots h_{-n}]$ that includes a respective hysteresis element corresponding to each candidate mode; (3) the candidate probability $$y_{-j}^{last\ selected}$$

associated with the last selected mode 308*a* (i.e., the mode that is currently being applied by vehicle 102), where $j\in\{1, 2, \ldots, n\}$; and (4) the hysteresis element $$h_{-j}^{last\ selection}$$

value that was applied during the selection of the candidate probability $$y_{-j}^{last\ selected}$$

Hysteresis decision operation 508 computes a difference between the value of each of the current filtered candidate mode selection probabilities vector $Y=[y_{-1}, Y_{-2}, \ldots y_{-n}]$ and the probability $$y_{-j}^{last\ selected}\left[y_{-1} - y_{-j}^{last\ selected},\ y_{-2} - y_{-j}^{last\ selected}\right.$$

associated with the last selected mode 308*a* to obtain the set of difference values, . . . , $$\left.y_{-n} - y_{-j}^{last\ selected}\right]$$

Each of the candidate mode-specific difference values are then compared to the value of the hysteresis element $$h_{-j}^{last\ selection}$$

from hysteresis vector $H=[h_{-1}, h_{-2}, \ldots h_{-n}]$ that corresponds to the last selected mode 308*a*. If one or more of the candidate mode-specific difference values has a greater value than the value of the hysteresis element $$h_{-j}^{last\ selection}$$

then the candidate mode that is associated with the highest candidate mode-specific difference value is selected as the candidate mode decision and output as the next operating mode 308*a*. In the event that none of the candidate mode-specific difference values has a greater value than the value of the hysteresis element $$h_{-j}^{last\ selection}$$

the hysteresis decision operation 508 does not output an operating mode 308*a* and instead moves on to process an updated set of filtered candidate modes Y in the real-time data stream. Thus, for each filtered candidate mode selection represented in probabilities vector Y Hysteresis decision operation 508 determines a difference between the probability computed for each of the candidate modes and the probability value generated in respect of the last subsystem operating mode 308*a* output by the mode analyzer 306*a*. If the highest difference (e.g., distance) computed is also higher than the hysteresis value that corresponds to the previously selected mode then the mode element that generated the highest difference is selected and output as the subsystem operating mode 308*a*. In at least some example implementations, the values of the elements of hysteresis vector $\{H \in \mathbb{R}^n\}$, are set based on data recorded during expert driver acquisition of data for the training data 804. In the driveline mode example noted above (candidate modes=RWD; 4WD; 4WD Locked), the values for $h_{\_4WD}$ and $h_{\_4WD}$ Locked can be greater than that of $h_{\_RWD}$, such that the delay required for moving to RWD from a 4WD mode will be greater than the delay for moving from a 4WD mode to RWD. In at least some examples, the values of hysteresis vector $\{H \in \mathbb{R}^n\}$ can be set at different values based on the current real-state vehicle state data 310. For example, the hysteresis values may decrease as vehicle speed increases, thereby reducing delays in mode changes at higher speeds.

Figure 3:
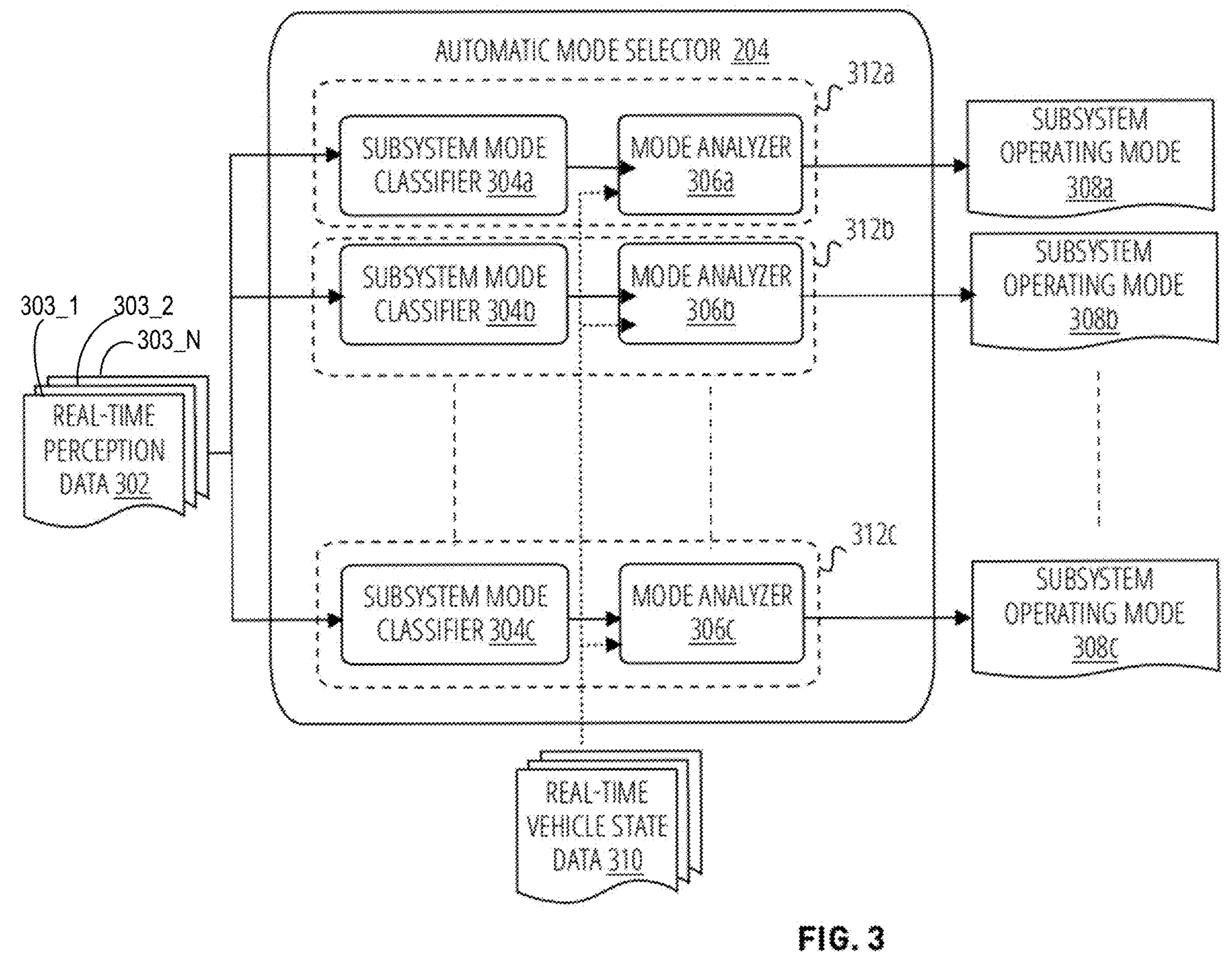
FIG. 3 illustrates a block diagram of an Automatic Mode Selector in accordance with one embodiment.

With reference to FIG. 3, the mode prediction and selection operations performed by mode selection channel 312*a* can also be performed in respect of other sub-systems by similarly configured mode selection channels 312*b*, . . . , 312*c*. In some examples a single mode selection channel can be used to select an omnibus mode that can set operating parameters for a combination of subsystems.

Examples of some specific mode selection scenarios will now be described.

In one example, Vehicle 102 is an off-road 4 wheel drive enabled vehicle with front and rear differentials and the Driveline 212 subsystem can be operated in a plurality of different discrete operating modes. The set of possible driveline operating modes and the operating parameters defined by each of the modes are represented in the following Table 1:

TABLE 1

| Driveline modes | |
|---|---|
| Mode ID | Operating Parameters |
| RWD Lock | Rear wheel drive, differential locked |
| RWD Unlock | Rear wheel drive, differential unlocked |
| FWD Lock | Front wheel drive, differential locked |
| FWD Unlock | Front wheel drive, differential unlocked |
| 4WDFL | 4 wheel drive, front differential locked, rear differential unlocked |
| 4WDRL | 4 wheel drive, front differential unlocked, rear differential locked |
| 4WDL | 4 wheel drive, front differential locked, rear differential locked |
| AWD | 4 wheel drive (“all wheel drive”), front differential unlocked, rear differential unlocked |

In one example, the case of Driveline 212, the mode selection channel 312*a* is configured to process real-time perception data 302 and real-time vehicle state data 310 to automatically select which of the eight possible driveline modes should be implemented by the Driveline 212 to optimize vehicle performance In this regard, real-time perception data 302 provides information about the upcoming environment that will be experienced over the next several seconds by the Vehicle 102, including for example image data about the upcoming surface terrain (e.g., upcoming changes in terrain altitude or height and surface condition (snow, ice, water, mud, rock). In at least some examples this information can be indicative of respective conditions at multiple surface contact points (i.e., each of the four wheels) of the Vehicle 102. With reference to FIG. 4 Pre-processor 402 of the Subsystem Mode Classifier 304*a* pre-processes real-time perception data 302 into a format suitable for fitted inference model 404. In the illustrated example, fitted inference model 404 has been trained based on a training dataset obtained through real-life tracking of driveline mode selections made by an expert driver through all terrain and driving conditions examples that Vehicle 102 can be reasonably expected to experience.

Fitted inference model 404 maps the on-going pre-processed real-time perception data to a respective time-series set of candidate mode predictions 406. Each candidate mode prediction 406 corresponds to one of the eight possible driveline modes identified in Table 1. In some examples, the candidate mode predictions 406 are predicted at a rate of 5 to 15 per second. With reference to FIG. 5, the candidate mode predictions 406 are provided to Mode Analyzer 306*a* for discrete mode analysis and selection 502. In some examples, Mode Analyzer 306*a* selects a preliminary mode based on a sampling of the set of candidate mode predictions 406 based on predefined sampling criteria (e.g., the most common mode in the last 3 seconds). The preliminary mode selection is then evaluated based on predefined appropriateness criteria (e.g., rules that define: what driveline modes can be performed in succession; how often the driveline mode can be changed; if current vehicle speed (or other defined characteristics represented in vehicle state data 310) are suitable for the preliminary mode selection to be implemented. In the event that the analysis indicates that the preliminary mode selection is appropriate, the preliminary mode selection is output as a new Subsystem Operating Mode 308*a* and is provided by the vehicle control system 108 to DCM 220 for implementation as the vehicle driveline mode for an upcoming time period until a new replacement mode is provided. In the event that the analysis indicates that the preliminary mode selection is not appropriate, the preliminary mode selection is discarded and the Driveline 212 will continue in the previously instructed mode.

In a further example, Vehicle 102 is a recreational off-road vehicle with only 3 driveline modes, (n=3) namely: (1) Rear Wheel Drive (RWD); (2) Four Wheel Drive (4WD); and (3) Locked Differential Four Wheel Drive (4WD Locked). The mode selection channel 312*a* is configured to process real-time perception data 302 in the from a video feed from a single 2D forward facing video camera 234 and real-time vehicle state data 310 to automatically select which of the three possible driveline modes should be implemented by the Driveline 212 to optimize vehicle performance. The video frames generated by video camera 234 provides information about the upcoming environment that will be experienced over the next several seconds by the Vehicle 102, including for example image data about the upcoming surface terrain (e.g., upcoming changes in terrain altitude or height and surface condition (snow, ice, water, mud, rock). In at least some examples this information can be indicative of respective conditions at multiple surface contact points (i.e., each of the four wheels) of the Vehicle 102. With reference to FIG. 4, pre-processor 402 of the Subsystem Mode Classifier 304*a* pre-processes the real-time video frames 302_1 to 303_N into a format suitable for fitted inference model 404. For example, as described above, this can include sampling to extract a sub-set Ns of the real-time video frames 302_1 to 303_N, followed by re-sizing and cropping operations to obtain a conditioned set of video frames 302_1 to 303_Ns.

The video frames 302_1 to 303_Ns are provided to fitted inference model 404, which generates a time-series of respective candidate predictions 406, where each prediction is represented as a mode probability vector X=[x_RWD; x_4WD; x_4WD Locked].

With reference to FIG. 5, the candidate mode predictions 406 are provided to Mode Analyzer 306*a* for discrete mode analysis and selection 502. In the present example, impulse response filtering (IRF) operation 504 applies a low pass filter to control the rate at which mode probabilities vectors Y=[y_RWD; y_4WD; y_4WD Locked] are selected from the input probability vectors X=[x_RWD; x_4WD; x_4WD Locked] and provided to downstream operations. Timeout check 506 can then be performed to determine if sufficient time has elapsed since a previous operating mode 308*a* was output. If sufficient time has elapsed, then hysteresis decision operation 508 is applied to select an operating mode from the current probabilities vectors Y=[y_RWD; y_4WD; y_4WD Locked] based on a defined hysteresis vector H=[$h_{\_1}$, $h_{\_2}$, . . . $h_{\_3}$]. In particular, hysteresis decision operation 508 computes a difference between the value of each of the current filtered candidate mode selection probabilities vector Y=[y_RWD; y_4WD; y_4WD Locked] and the probability $$y_{\_j}^{last\ selected}$$

associated with the last selected mode 308*a* to obtain the set of difference values $$\Big[y\_\mathrm{RWD}_{\_I} - y_{\_j}^{last\ selected}$$

$$y\_4WD - y_{\_j}^{last\ selected}$$

$$y\_4WD\ \mathrm{Locked} - y_{\_j}^{last\ selected}\Big]$$

Each of the candidate mode-specific difference values are then compared to the value of the hysteresis element $$h_{\_j}^{last\ selection}$$

used for the last selection. If one or more of the candidate mode-specific difference values has a greater value than the value of the hysteresis element $$h_{\_j}^{last\ selection}$$

then the candidate mode that is associated with the highest candidate mode-specific difference value is selected as the candidate mode decision and output as the next operating mode 308*a*.

In some example embodiments, driver interface system 110 includes a real-time visual display that indicates the operating mode 308*a* that is currently being applied by the drivetrain.

In a further example, Vehicle 102 is a recreational off-road vehicle with a Transmission 210 that has multiple discrete gear modes that permit forward movement The set of possible gear modes and the operating parameters defined by each of the modes are represented in the following Table 2:

TABLE 2

| Transmission Gear modes | |
|---|---|
| Mode ID | Operating Parameters |
| LOW | Transmission Gearing set to provide higher torque and lower speeds to wheels from engine power (e.g., used for hill climbing or very rugged terrain) |
| HIGH | Transmission Gearing set to provide higher speeds, lower torque to wheels for the same engine power (e.g., used for hill climbing or very rugged terrain) |
| NEUTRAL | Disengages engine power |

In one example, the case of Transmission 210, the mode selection channel 312*b* is configured to process real-time perception data 302 and real-time vehicle state data 310 to automatically select which of the three possible gear modes should be implemented by the Transmission 210 to optimize vehicle performance. Fitted inference model 404 of the Subsystem Mode Classifier 304*b* has been trained based on a training dataset obtained through real-life tracking of gear mode selections made by an expert driver through all terrain and driving conditions examples that Vehicle 102 can be reasonably expected to experience.

Fitted inference model 404 of the Subsystem Mode Classifier 304*b* maps the on-going pre-processed real-time perception data to a respective time-series set of candidate mode predictions 406. Each candidate mode predictions 406 corresponds to one of the three possible gear modes identified in Table 2. The candidate mode predictions 406 are provided to Mode Analyzer 306*b* for discrete mode analysis and selection 502. As discussed above, Mode Analyzer 306*b* selects a preliminary mode based on a sampling of the set of candidate mode predictions 406, and the preliminary mode selection is then evaluated based on predefined appropriateness criteria for gear selection.

In one example, Vehicle 102 is equipped with a Suspension 226 subsystem that allows a flow rate of hydraulic shock absorbers of Suspension 226 to be adjusted to different levels that correspond to respective suspension modes that each provide a respective level of ride firmness. An example of the set of possible suspension modes and the operating parameters defined by each of the modes are represented in the following Table 3:

TABLE 3

| Suspension modes | |
|---|---|
| Mode ID | Operating Parameters |
| SOFT | shock absorbers set to maximum flow rate to provide soft ride |
| MEDIUM | shock absorbers set to middle flow rate to provide balanced ride |
| HARD | shock absorbers set to maximum flow rate to provide firm ride |

In one example, the mode selection channel 312*c* is configured to process real-time perception data 302 and real-time vehicle state data 310 to automatically select which of the three possible gear modes should be implemented by the Transmission 210 to optimize user experience. Fitted inference model 404 of the Subsystem Mode Classifier 304*c* has been prefitted based on a training dataset obtained through real-life tracking of suspension mode selections made by an expert driver through all terrain and driving conditions examples that Vehicle 102 can be reasonably expected to experience.

Fitted inference model 404 of the Subsystem Mode Classifier 304*c* maps the on-going pre-processed real-time perception data to a respective time-series set of candidate mode predictions 406. Each candidate mode prediction 406 corresponds to one of the three possible gear modes identified in Table 3. The candidate mode predictions 406 are provided to Mode Analyzer 306*c* for discrete mode analysis and selection 502. As discussed above, Mode Analyzer 306*c* selects a preliminary mode based on a sampling of the set of candidate mode predictions 406, and the preliminary mode selection is then evaluated based on predefined appropriateness criteria for implementation.

Although three discrete suspension modes are shown in Table 3, in some examples there could be more or fewer discrete modes; for example there could be 10 discrete suspension modes (denoted as Modes 1-10), with Mode 1 being the softest ride and 10 being the firmest ride.

In some examples, the Suspension 226 could have other modes associated with other components of the system. For example, in the case of an air-ride equipped Suspension 226, different modes that could be selected by a respective subsystem mode selection channel could be associated with different inflation levels for the suspension air-bags and/or different rates of air-bag compression and expansion.

In another example, different modes for Steering 222 subsystem can be selected by a subsystem mode selection channel 312*a* having a suitably fitted inference model 404. These steering modes could for example include “minimum assistance”, “medium assistance” and “maximum assistance”, with each mode having a respective power steering assist parameter value.

In another example, different modes for Steering 222 subsystem can be selected by a subsystem mode selection channel having a suitably fitted inference model 404. These steering modes could for example include “minimum assistance”, “medium assistance” and “maximum assistance”, with each mode having a respective power steering assist parameter value.

In another example, different discrete modes for steering feedback by Driver Interface System 110 can be selected by a respective subsystem mode selection channel having a suitably fitted inference model 404. These steering feedback modes could for example include “minimum feedback”, “medium feedback” and “maximum feedback”, with each mode having a respective feedback force parameter value.

In another example, different discrete modes for front headlight lighting subsystem can be selected by a subsystem mode selection channel having a suitably fitted inference model 404. These modes could for example include “high beam”, and “low beam”.

In another example, different discrete modes for Braking 230 subsystem can be selected by a respective subsystem mode selection channel having a suitably fitted inference model 404. These modes could for example include “ABS ON” and “ABS “OFF”.

As noted above, in some examples a mode selection channel (for example mode selection channel 312*a*) could be configured to select a mode that includes defined parameters for multiple subsystems. For example, a set of alternative vehicle modes could include: (a) Comfort Mode: This mode sets parameters for a number of vehicle subsystems (e.g., Suspension 226, Steering 222, Powertrain 206) to prioritize a smooth and comfortable driving experience. The subsystem parameters are configured to result in softer suspension settings, lighter steering, and smoother gear shifts; (b) Sport Mode: Sport mode is designed to provide a more engaging driving experience. This mode sets parameters for a number of vehicle subsystems (e.g., Suspension 226, Steering 222, Powertrain 206) that are configured to provide more responsive throttle, stiffer suspension, heavier steering, and holding gears longer before shifting to keep the engine in its power band; and (c) Normal Mode: Normal mode provides a balance between comfort, efficiency, and performance. This mode sets default parameters for a number of vehicle subsystems (e.g., Suspension 226, Steering 222, Powertrain 206). In example embodiments, a suitably fitted inference model 404 is configured to select candidate mode predictions 406 from among these three options based on real-time perception data 302, and a suitably configured discrete mode analysis and selection operation 502 generates a final mode selection that is then used by vehicle control system 108 to cause each of the affected Vehicle Operation Subsystems 106 to act in a manner that collectively implements the selected vehicle mode.

In some example embodiments one or more of the mode selection channels (for example mode selection channel 312*a*) can be configured to function in a discrete domain as described above, or alternatively in a continuous domain. By way of example, FIG. 6 illustrates an alternative example of Mode Analyzer 306*a* that can be selectively configured to operate in a discrete mode selection domain by applying discrete mode analysis and selection operation 502 as described above, or alternatively, in a continuous mode selection domain by applying continuous mode analysis and selection operation 604 to candidate mode predictions 406. Rather than providing discrete subsystem mode outputs, the continuous mode analysis and selection operation 604 is configured to output an ongoing time series of subsystem settings at a higher rate (e.g., rather than a discrete mode of 10 Hz, or larger durations such as every 5 to 10 seconds, updated subsystem settings may be output at a higher frequency (i.e., effectively continuous) rate. Thus, the continuous domain can provide faster-rate, finer control of subsystem operating parameters.

By way of example, in the case of the above-described suspension mode example, the suspension modes shown in Table 3 could correspond to possible outputs generated by discrete mode analysis and selection operation when the Mode Analyzer 306*a* is operating in a discrete domain. However, when the Mode Analyzer 306*a* is operating in a continuous domain, an updated suspension damping setting may be generated at a high rate including for example up to 100 Hz, effectively providing continuous adjustment of the shock absorbers of Suspension 226.

In some examples the Mode Analyzer 306*a* includes a domain selecting component 602 for selecting discrete domain or continuous domain mode section options. In some examples the domain selecting component 602 may be controlled by a user input or predetermined rules. In some examples it may be pre configured for discrete domain or continuous domain mode section depending on a factory or installation setting based on the type of subsystem that the modes will be applied to.

Figure 7:
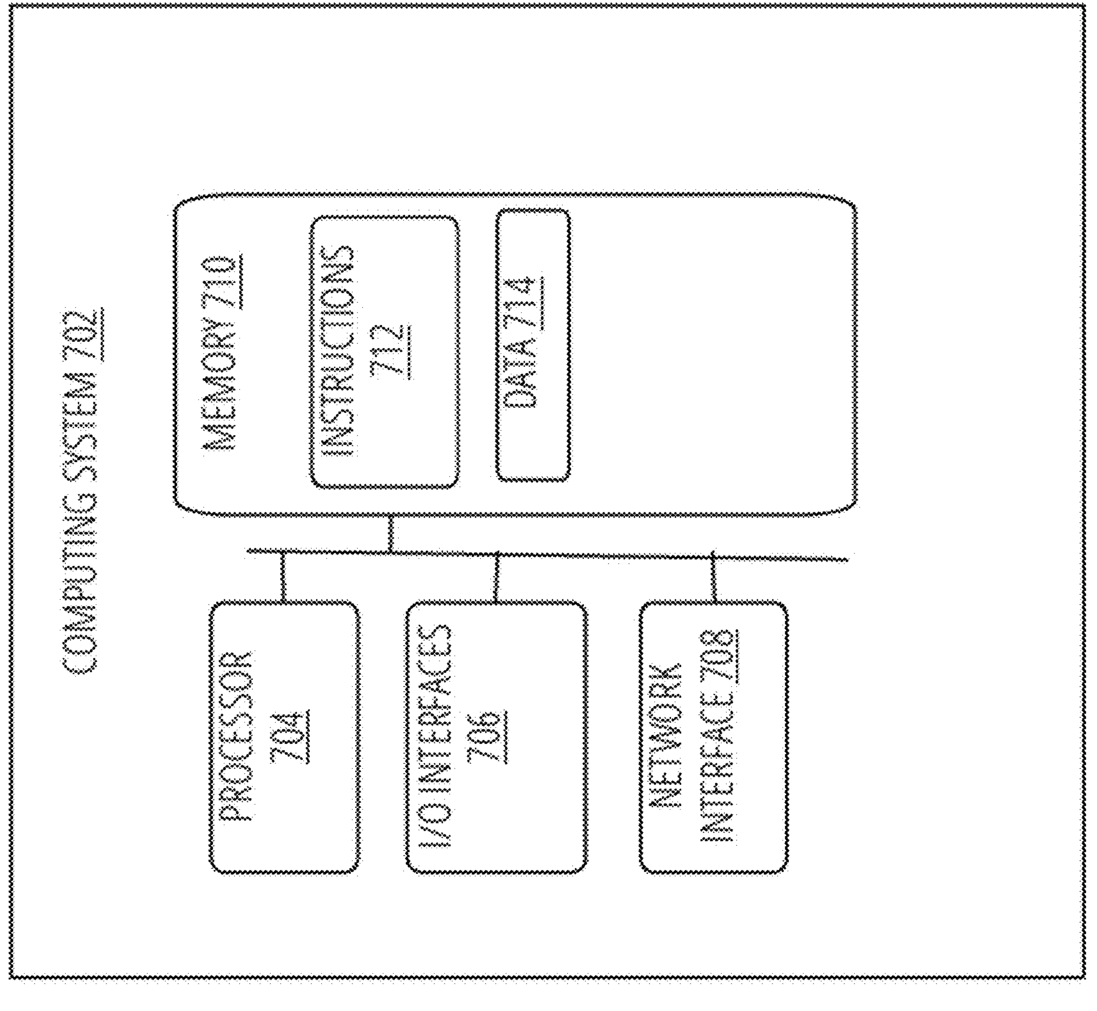
FIG. 7 illustrates an example computer system in accordance with one embodiment.

With reference to FIG. 7, in at least some examples the automatic mode selector 204 and other computer implemented components of Vehicle 102 can be implemented by one or more Computing Systems 702 that are embedded in Vehicle 102. Computing System 702 can, for example, include one or more Processors 704, I/O Interfaces 706, Network Interfaces 708, Memory(ies) 710, Instructions 712, and Data 714. In example embodiments, Memory 710 includes non-transient memory storing Instructions 712, and Data 714 that when executed by the one or more Processors 704 cause the Computing System 702 to implement automatic mode selector 204 and possibly other control components of the Vehicle 102

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The contents of all publications referenced in this disclosure are incorporated by reference.

The terms "substantially" and "approximately" as used in this disclosure mean that the recited characteristic, parameter, or value need not be achieved exactly, but that deviations or variations including for example, tolerances, measurement error measurement accuracy limitations and other factors known to those skilled in the art, may occur in amounts that do not preclude the effect the characteristic was intended to provide. In some examples, the terms "substantially" and "approximately", can mean a range of within 10% of the stated characteristic.

What is claimed is:

1. A computer implemented method for automatically selecting a mode for a vehicle, comprising:

receiving, through a video camera of the vehicle, real-time perception data comprising a sequence of image frames representing an environment in a direction of travel of the vehicle;

predicting, using a first fitted inference model, based on the sequence of image frames, a sequence of first-subsystem candidate mode predictions for a first-subsystem of the vehicle, wherein the first-subsystem candidate mode predictions correspond to a set of predefined modes for the first-subsystem, each of the predefined modes defining a respective set of one or more operating parameters for the first-subsystem;

determining, based on the sequence of first-subsystem candidate mode predictions, a first-subsystem mode; and causing the first-subsystem mode to be implemented by the first-subsystem.

2. The method of claim 1 wherein determining the first-subsystem mode comprises:

filtering the sequence of first-subsystem candidate mode predictions to identify a possible first-subsystem mode prediction; and selecting the first-subsystem mode based on the possible first-subsystem mode prediction.

3. The method of claim 2 wherein each of the first-subsystem candidate mode predictions comprises a candidate mode probabilities vector that includes a respective probability value for each of the predefined modes for the first-subsystem, wherein filtering the predicted sequence of first-subsystem candidate mode predictions comprises applying an impulse response filter to the sequence of first-subsystem candidate mode predictions, an output of the impulse response filter comprising the possible first-subsystem mode prediction.

4. The method of claim 3 wherein the filtering is based on a most recent prediction in the sequence of first-subsystem candidate mode predictions, past predictions in the sequence of first-subsystem candidate mode predictions and past possible first-subsystem mode predictions output by the filtering.

5. The method of claim 3 wherein filtering applies low pass filtering to the sequence of first-subsystem candidate mode predictions.

6. The method of claim 3 wherein determining the first-subsystem mode further comprises performing a time check to confirm that a time threshold has passed since a last first-subsystem mode was caused to be implemented, and when the time threshold has not passed, causing the receiving, predicting and determining to be repeated without causing the first-subsystem mode to be implemented by the first-subsystem.

7. The method of claim 3 wherein selecting the first-subsystem mode based on the possible first-subsystem mode prediction comprises performing a hysteresis decision based on a most recent first-subsystem mode that was caused to be implemented.

8. The method of claim 7 wherein performing the hysteresis decision comprises:

computing, for each of the predefined modes, a mode-specific difference between the probability value for each of the predefined modes in the first-subsystem mode prediction and a probability value determined for the most recent first-subsystem mode that was caused to be implemented;

computing for each mode-specific difference that has a value greater than a predefined mode-specific hysteresis value that corresponds to the most recent first-subsystem mode that was caused to be implemented, a difference between the mode-specific difference and the predefined mode-specific hysteresis value; and selecting, as the first-subsystem mode, a mode associated with a highest computed difference between the mode-specific difference and the predefined mode-specific hysteresis value.

9. The method of claim 3, further comprising pre-processing the real-time perception data prior to the predicting, the pre-processing comprising: (i) extracting a subset of image frames from the sequence of image frames; and (ii) resizing and cropping image frames included in the extracted subset of image frames, wherein the predicting comprises predicting a respective first-subsystem candidate mode prediction for each of the resized and cropped image frames included in the extracted subset of image frames.

10. The method of claim 9 further comprising receiving, through a vehicle sensor system, real-time vehicle state data indicating current operating characteristics of the vehicle, wherein at least one of a filtering rate used for the filtering and a rate used for extracting the subset of image frames, is based on a vehicle speed included in the real-time vehicle state data.

11. The method of claim 1 wherein the first-subsystem corresponds to a driveline system of the vehicle and the set of predefined modes comprises a four wheel drive mode and a two wheel drive mode.

12. The method of claim 1 wherein the first-subsystem corresponds to a suspension system of the vehicle and the set of predefined modes comprises a first mode, a second mode and a third mode, where the first mode corresponds to a softer ride than the second mode and the second mode corresponds to a softer ride than the third mode.

13. The method of claim 1 further comprising pre-training the first fitted inference model, the pre-training comprising:

obtaining a time-stamped sequence of image frames captured by a forward-facing camera video camera of a test vehicle during operation of the test vehicle by an expert driver;

obtaining a time-stamped sequence of mode inputs performed by the expert driver contemporaneously with the capturing of the image frames;

merging the sequence of the images frames and the mode inputs to provide a set of labelled training image frames; and training a convolution neural network based on the labelled training image frames to obtain the first fitted inference model.

14. The method of claim 1 wherein determining the first-subsystem mode comprises:

identifying, based on the sequence of first-subsystem candidate mode predictions, a possible first-subsystem mode that is appropriate for real-time implementation by the first-subsystem; and confirming that the possible first-subsystem can be applied as the first-subsystem mode based on a time duration since a most recently implemented first-subsystem candidate mode.

15. The method of claim 14 wherein identifying a possible first-subsystem candidate mode that is appropriate comprises confirming that the real-time implementation will meet specified vehicle criteria, wherein the vehicle criteria specifies one or more operating constraints at which the first-subsystem candidate mode can be implemented, the operating constraints including one or more of a maximum speed, operating state of one or more other vehicle subsystems, and a direction of travel.

16. A computer implemented method for automatically selecting a mode for a vehicle, comprising:

receiving, through a perception system of the vehicle, real-time perception data representing an environment in a desired direction of travel of the vehicle;

predicting, using a first fitted inference model, based on the real-time perception data, a sequence of first-subsystem candidate mode predictions for a first-subsystem of the vehicle, wherein each of the first-subsystem candidate mode predictions corresponds to a set of predefined modes for the first-subsystem, each of the predefined modes defining a respective set of one or more operating parameters for the first-subsystem;

determining, based on the sequence of first-subsystem candidate mode predictions, a first-subsystem mode; and causing the first-subsystem mode to be implemented by the first-subsystem.

17. A vehicle equipped with a computer system, the computer system being configured for automatically selecting an operating mode for the vehicle by:

receiving, through a video camera of the vehicle, a sequence of image frames representing upcoming terrain in a direction of travel of the vehicle;

predicting, using a first fitted inference model, based on the sequence of image frames, a sequence of candidate mode predictions for the vehicle, wherein the candidate mode predictions correspond to a set of predefined modes for a system of the vehicle, each of the predefined modes defining a respective set of one or more operating parameters for the system;

determining, based on the sequence of candidate mode predictions, a system mode; and causing the system mode to be implemented by the vehicle.

18. The vehicle of claim 17, wherein determining the system mode comprises:

filtering the sequence of candidate mode predictions to identify a possible system mode prediction; and selecting the system mode based on the possible system mode prediction.

19. The vehicle of claim 18 wherein each of the candidate mode predictions comprises a candidate mode probabilities vector that includes a respective probability value for each of the predefined modes, wherein filtering the sequence of candidate mode predictions comprises applying an impulse response filter to the sequence of candidate mode predictions, an output of the impulse response filter comprising the possible system mode prediction.

20. The vehicle of claim 19 wherein the filtering is based on a most recent prediction in the sequence of candidate mode predictions, past predictions in the sequence of candidate mode predictions and past possible system mode predictions output by the filtering.

* * * * *